US012403489B2

(12) United States Patent
Tobe et al.

(10) Patent No.: US 12,403,489 B2
(45) Date of Patent: Sep. 2, 2025

(54) SLIT NOZZLE AND METHOD FOR MANUFACTURING HIGH-SILICON STEEL STRIP

(71) Applicant: JFE STEEL CORPORATION, Tokyo (JP)

(72) Inventors: Teruhiko Tobe, Tokyo (JP); Takashi Doi, Tokyo (JP); Shinji Koseki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 781 days.

(21) Appl. No.: 17/288,811

(22) PCT Filed: Aug. 13, 2019

(86) PCT No.: PCT/JP2019/031839

§ 371 (c)(1),
(2) Date: Apr. 26, 2021

(87) PCT Pub. No.: WO2020/084873

PCT Pub. Date: Apr. 30, 2020

(65) Prior Publication Data

US 2022/0008938 A1 Jan. 13, 2022

(30) Foreign Application Priority Data

Oct. 26, 2018 (JP) ................................. 2018-201623

(51) Int. Cl.
*B05B 1/30* (2006.01)
*B05B 1/00* (2006.01)
(Continued)

(52) U.S. Cl.
CPC ................ *B05B 1/30* (2013.01); *B05B 1/005* (2013.01); *B05B 1/044* (2013.01); *C23C 10/08* (2013.01)

(58) Field of Classification Search
CPC ........... B05B 1/30; B05B 1/005; B05B 1/044; C23C 10/08
See application file for complete search history.

(56) References Cited

U.S. PATENT DOCUMENTS

2002/0134507 A1* 9/2002 DeDontney ....... C23C 16/45595 156/345.33

FOREIGN PATENT DOCUMENTS

CN 101884962 A 11/2010
CN 104395514 A 3/2015
(Continued)

OTHER PUBLICATIONS

Translation of JP 2015-124428, Masakatsu, Mar. 5, 2024 (Year: 2024).*
(Continued)

*Primary Examiner* — Jeremy Carroll
(74) *Attorney, Agent, or Firm* — Oliff PLC

(57) ABSTRACT

A slit nozzle having a double-tube structure and a method for manufacturing a high-silicon steel strip having a small variation in Si concentration depending on the position in the width direction of the steel strip. The slit nozzle has a double-tube structure, in which a flow-control plate which closes a gap between an inner tube and an outer tube is disposed between an open end of the inner tube and an end of a delivery port, and in which an opening is formed in a plane in which the flow-control plate is disposed only in a range of the flow-control plate of 27.5° or more and 332.5° or less in terms of a central angle with respect to a reference line L1 passing through the axis of the outer tube and the central position in the width direction of the delivery port.

8 Claims, 9 Drawing Sheets

(51) Int. Cl.
*B05B 1/04* (2006.01)
*C23C 10/08* (2006.01)

(56) References Cited

FOREIGN PATENT DOCUMENTS

| | | | |
|---|---|---|---|
| EA | 2 868 785 | A1 | 5/2015 |
| JP | S62-227078 | A | 10/1987 |
| JP | H05-9704 | A | 1/1993 |
| JP | H08-176793 | A | 7/1996 |
| JP | H10-237621 | A | 9/1998 |
| JP | 3300952 | B1 | 7/2002 |
| JP | 2005-281843 | A | 10/2005 |
| JP | 2015-124428 | A | 7/2015 |
| RU | 1801129 | A3 | 3/1993 |
| SU | 667250 | A1 | 6/1979 |
| SU | 954442 | A1 | 8/1982 |

OTHER PUBLICATIONS

Jul. 26, 2023 Office Action issued in Chinese Patent Application No. 201980069758.1.
Oct. 8, 2019 International Search Report issued in International Application No. PCT/JP2019/031839.
Nov. 10, 2020 Office Action issued in Japanese Application Patent No. 2019-561341.
May 6, 2020 Office Action issued in Taiwanese Patent Application No. 108131101.
Aug. 20, 2021 Office Action issued in Russian Patent Application No. 2021111868.
Sep. 1, 2022 Office Action issued in Korean Patent Application No. 10-2021-7011668.
Sep. 5, 2022 Office Action issued in Chinese Patent Application No. 201980069758.1.
Mar. 15, 2023 Office Action issued in Chinese Patent Application No. 201980069758.1.

* cited by examiner

SLIT NOZZLE AND METHOD FOR MANUFACTURING HIGH-SILICON STEEL STRIP

TECHNICAL FIELD

This application relates to a slit nozzle and a method for manufacturing a high-silicon steel strip. In more detail, the application relates to a slit nozzle having a double-tube structure with which it is possible to decrease a variation in the flow rate of a blown gas depending on the position in the axis direction and to a method for manufacturing a high-silicon steel strip which utilizes the slit nozzle.

BACKGROUND

Examples of a known method for industrially manufacturing a high-silicon steel strip having a Si content of 4 mass % or more include a siliconizing treating method. This manufacturing method is a method in which a high-silicon steel strip is continuously manufactured by blowing a treatment gas containing silicon tetrachloride ($SiCl_4$) onto a thin steel strip having a Si concentration of less than 4 mass % at a high temperature to make Si permeate into the steel strip and by performing a heat treatment on the steel strip so that the Si which has permeated into the surface of the steel strip is diffused in the thickness direction.

Examples of a known method for blowing the treatment gas include a method in which slit nozzles having a delivery port (slit) for the treatment gas are arranged on both the front-surface side and back-surface side of the steel strip in a siliconizing treating furnace and the treatment gas is blown through the gas delivery ports onto the steel strip (for example, refer to Patent Literature 1).

In addition, examples of a known slit nozzle 10 include a slit nozzle which is illustrated in a sectional view of FIG. 10 and which has a double-tube structure of an outer tube 20 having a delivery port (slit) 21 for the treatment gas and an inner tube 30 having one end through which the treatment gas is fed and another end which is open in the outer tube 20 (for example, refer to Patent Literature 2).

As illustrated in FIG. 10, in the case where the treatment gas is blown onto the steel strip by using such a slit nozzle 10, the flow rate of the treatment gas increases with an increase in the distance from the gas feeding port 31. Therefore, in the case of this method, there is a variation in the Si concentration depending on the position in the width direction of the steel strip due to a variation in the flow rate of the treatment gas blown through the slit nozzle. As a result, there is a problem in that a shape defect and a variation in magnetic properties occur in the steel strip due to a difference in lattice constant.

To solve such a problem, there is a known method for manufacturing a high-silicon steel strip in which, as illustrated in FIG. 11, by feeding the treatment gas to slit nozzles 10 adjacent to each other in the furnace length direction in such a manner that the gas is fed in opposite directions alternately, it is possible to decrease a variation in the Si concentration depending on the position in the width direction of a steel strip 11 (for example, refer to Patent Literature 2 and Patent Literature 3).

However, even in the case of the manufacturing methods according to Patent Literature 2 and Patent Literature 3 described above, it is not possible to sufficiently decrease a variation in the Si concentration depending on the position in the width direction of the high-silicon steel strip. Therefore, there is a demand for a slit nozzle having a double-tube structure which decreases a variation in the flow rate of a blown gas depending on the position in the axis direction as compared to the conventional slit nozzles.

CITATION LIST

Patent Literature

PTL 1: Japanese Unexamined Patent Application Publication No. 62-227078
PTL 2: Japanese Unexamined Patent Application Publication No. 8-176793
PTL 3: Japanese Unexamined Patent Application Publication No. 5-9704

SUMMARY

Technical Problem

The disclosed embodiments have been completed in view of the situation described above, and an object is to provide a slit nozzle having a double-tube structure with which it is possible to decrease a variation in the flow rate of a blown gas depending on the position in the axis direction and to provide a method for stably manufacturing a high-silicon steel strip having a small variation in the Si concentration depending on the position in the width direction of the steel strip.

Solution to Problem

In the process of the investigations regarding the reasons of the problem described above and the like which were conducted to solve the problems described above, the present inventors found that, by arranging a predetermined flow-control plate between an open end of an inner tube of a double-tube structure and the end of a delivery port for the treatment gas, it is possible to decrease a variation in the flow rate of a blown gas depending on the position in the axis direction, resulting in completion of the disclosed embodiments.

The subject matter of the disclosed embodiments for solving the problems described above is as follows.

[1] A slit nozzle having a double-tube structure including an outer tube having a delivery port for a treatment gas in an axis direction and a closed end, and an inner tube having a feeding port for the treatment gas on one end and an open end that is another end inside the closed end of the outer tube, the treatment gas being fed through the feeding port and blown through the delivery port, the slit nozzle including

- a flow-control plate which is disposed between the open end of the inner tube and an end, near the open end, of the delivery port and which closes a gap between the inner tube and the outer tube, wherein
- an opening is formed in a plane in which the flow-control plate is disposed only in a range of the flow-control plate of 27.5° or more and 332.5° or less in terms of a central angle with respect to a reference line passing through an axis of the outer tube and a central position in a width direction of the delivery port.

[2] The slit nozzle according to item [1], in which the flow-control plate is disposed at the open end of the inner tube.

[3] The slit nozzle according to item [1] or [2], in which the opening is formed symmetrically with respect to the reference line in the plane in which the flow-control plate is disposed.

[4] A method for manufacturing a high-silicon steel strip using a siliconizing treating method utilizing the slit nozzle according to any one of items [1] to [3], the method including:

- arranging a plurality of the slit nozzles in a threading direction of a steel strip in a siliconizing treating furnace such that slit nozzles or groups of slit nozzles adjacent to each other in the threading direction are arranged so that feeding ports for the treatment gas of the slit nozzles face opposite directions from each other, and
- feeding the treatment gas containing silicon tetrachloride ($SiCl_4$) through the feeding ports for the treatment gas into the slit nozzles and blowing the treatment gas through delivery ports for the treatment gas of the slit nozzles onto the steel strip transported.

Advantageous Effects

According to the disclosed embodiments, it is possible to decrease a variation in the flow rate of a blown gas depending on the position in the axis direction in a slit nozzle having a double-tube structure. In addition, by using such a slit nozzle, it is possible to stably manufacture a high-silicon steel strip having a small variation in the Si concentration depending on the position in the width direction of the steel strip.

DETAILED DESCRIPTION

Figure 1:
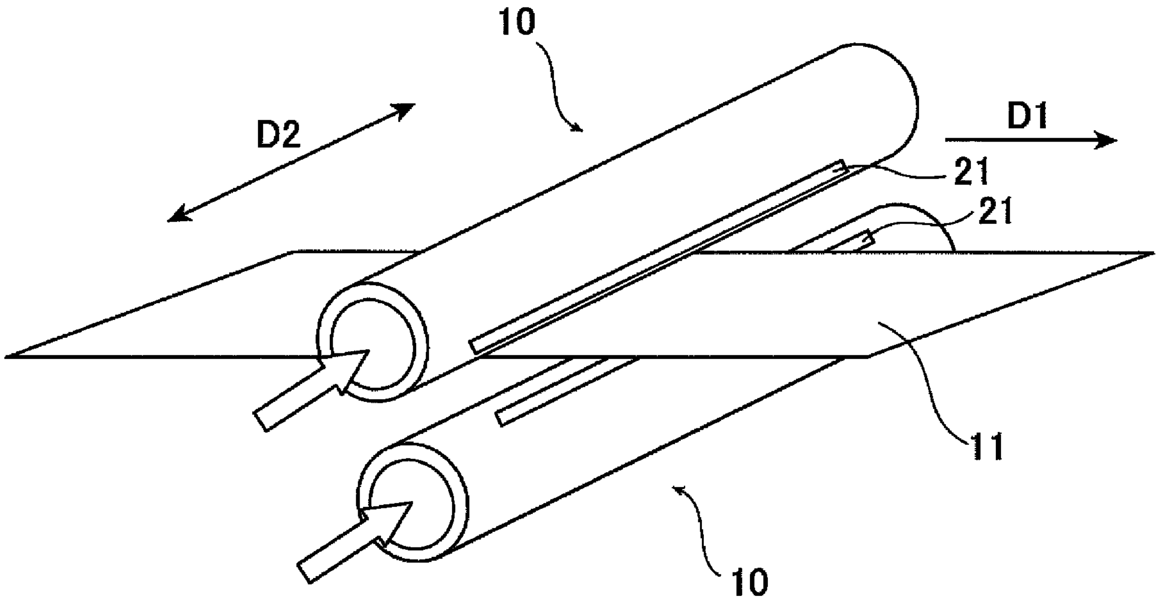
FIG. 1 is a perspective view illustrating slit nozzles and a steel strip in a siliconizing treating furnace.

Hereafter, embodiments will be described with reference to the drawings. However, it is not intended that the disclosed embodiments be limited to the illustrated examples. In addition, the flow directions of the treatment gas which flows in the slit nozzle or which is fed into the slit nozzle are indicated by the arrows in the drawings.

According to embodiments, a slit nozzle which has a double-tube structure including an outer tube and an inner tube and in which a treatment gas is blown through a delivery port. Here, although examples in which a siliconizing treatment is performed, that is, Si is made to permeate into a steel strip by using the slit nozzle, are described in the description of the embodiment below, the disclosed embodiments are not limited thereto and may be used for other purposes as long as the effects of the disclosed embodiments is realized. For example, the slit nozzle may be used when a ceramic film such as a TiN film is formed on a steel sheet or when various chemical vapor deposition treatments are performed not only on a steel sheet but also on an aluminum sheet, a copper sheet, or the like.

In the case of a siliconizing treatment utilizing a slit nozzle 10, a slit nozzle 10 having a delivery port (slit) 21 for a treatment gas is arranged on each of the front-surface side and back-surface side of a steel strip 11 in a siliconizing treating furnace and a treatment gas containing silicon tetrachloride ($SiCl_4$) is blown through the delivery port 21 of the slit nozzle 10 onto the steel strip 11 at a high temperature to make Si permeate into the steel strip (refer to FIG. 1). In addition, a heat treatment is performed on the steel strip so that the Si which has permeated into the surface of the steel strip is diffused in the thickness direction, thereby continuously manufacturing a high-silicon steel strip.

Figure 2:
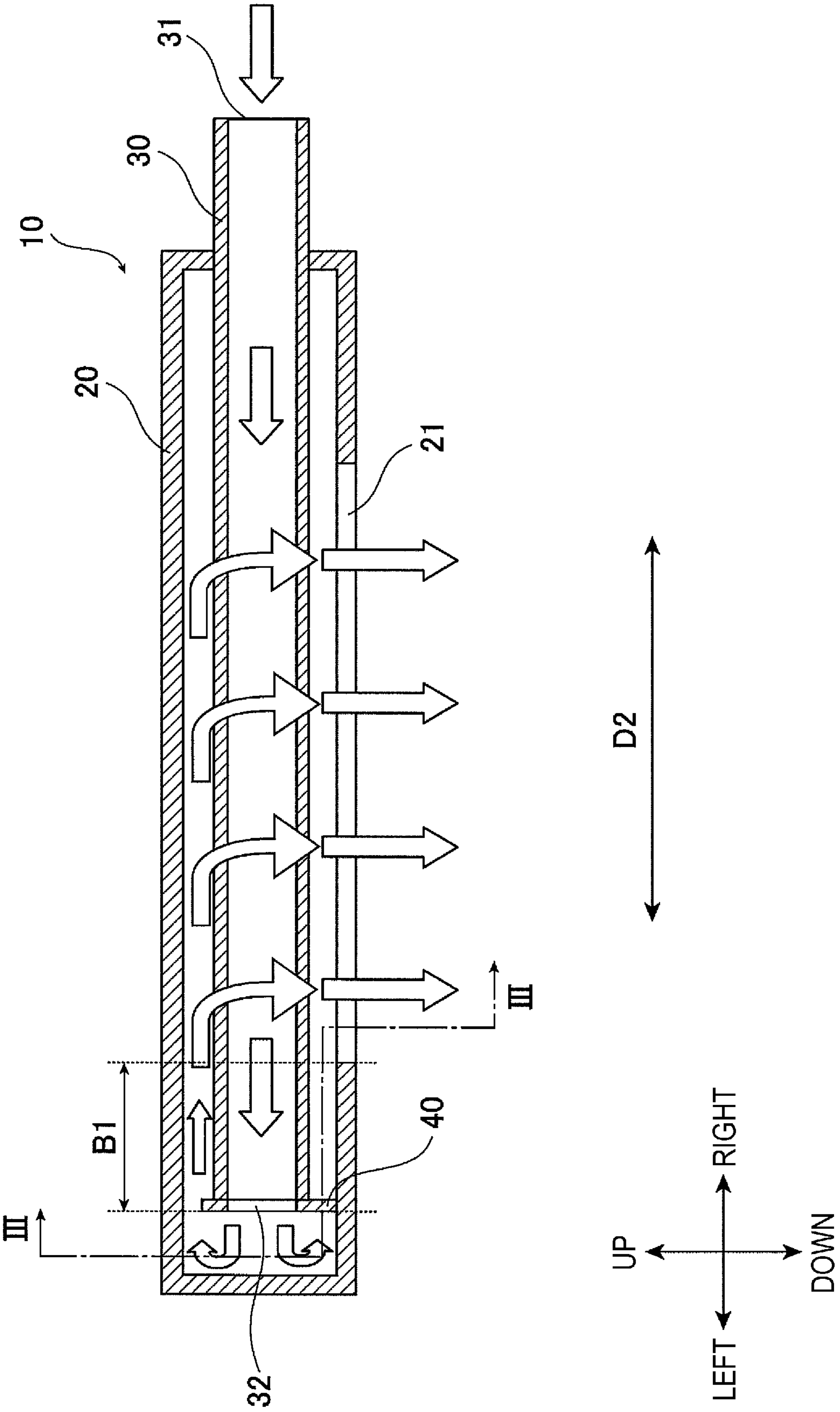
FIG. 2 is a sectional view illustrating an example of a slit nozzle according to an embodiment.

FIG. 2 is a sectional view of the slit nozzle 10 illustrated in FIG. 1. The slit nozzle 10 illustrated in FIG. 2, that is, an example of the slit nozzle according to the disclosed embodiments which is shown in a sectional view, has a double-tube structure including an outer tube 20 and an inner tube 30. In addition, a flow-control plate 40, which controls the flow of the treatment gas in the slit nozzle 10, is disposed inside the slit nozzle 10.

The outer tube 20 has a delivery port (slit) 21 for a treatment gas in the axis direction D2. In addition, one end (end on the left-hand side of FIG. 2) of the outer tube 20 is closed. In addition, in the case of the example illustrated in FIG. 2, the outer tube 20 has a hole, which has a diameter corresponding to the outer diameter of the inner tube 30 so that it is possible to dispose the inner tube 30 inside the outer tube, at the other end (end on the right-hand side of FIG. 2) of the outer tube 20 with other part of the other end being closed. However, the other end (end on the right-hand side of FIG. 2) of the outer tube 20 does not necessarily have to be closed.

The inner tube 30 is disposed inside the outer tube 20. In addition, the inner tube 30 has a feeding port 31 for a treatment gas at one end (on the right-hand side of FIG. 2) and another end (on the left-hand side of FIG. 2) of the inner tube 30 is open inside the one end, which is closed, of the outer tube 20.

In addition, as illustrated in FIG. 2, when a treatment gas is blown into the slit nozzle 10 through the feeding port 31, the treatment gas is transported through the inside of the inner tube 30 and blown through an open end 32 of the inner tube 30 into the inside of the one end, which is closed, of the outer tube 20. Subsequently, the treatment gas is made to turn back inside the outer tube 20, transported through a gap between the outer tube 20 and the inner tube 30, and, finally, blown out through the delivery port 21 of the outer tube 20.

In the case of the example illustrated in FIG. 2, the flow-control plate 40 is disposed at the open end of the inner tube 30 so as to close the gap between the inner tube 30 and the outer tube 20. Here, the position at which the flow-control plate 40 is disposed is not limited to this example, and the flow-control plate 40 may be disposed at any position within the range indicated by B1 between the open end 32 and the end of the delivery port 21 near the open end 32 (refer to FIG. 2). However, it is preferable that the flow-control plate 40 be disposed at the open end of the inner tube 30 described above from the viewpoint of manufacturing efficiency.

Figure 3:
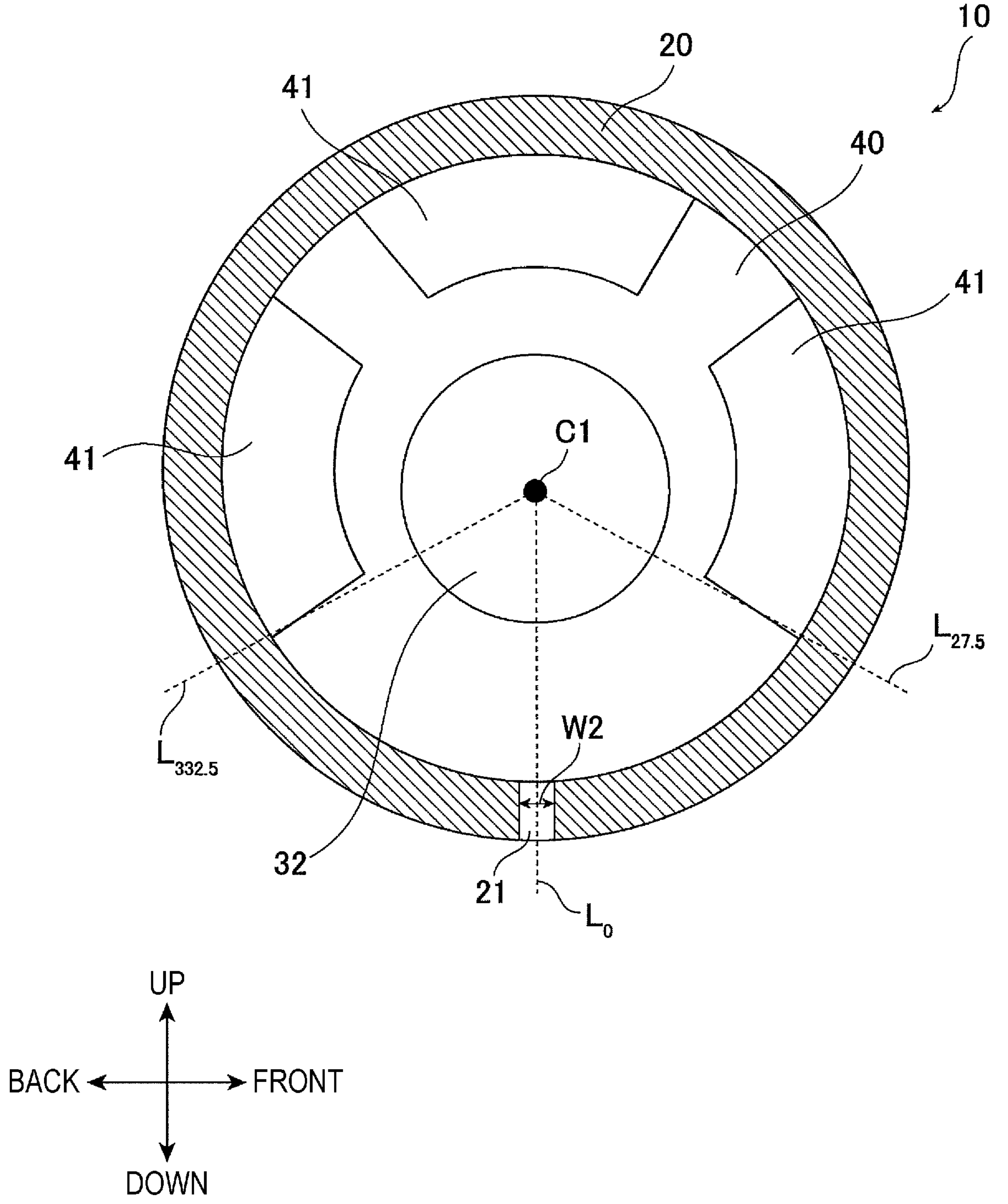
FIG. 3 is a sectional view along line III-III in FIG. 2 illustrating an example of a flow-control plate.

In addition, FIG. 3 is a sectional view along line III-III in FIG. 2 illustrating the plane in which the flow-control plate 40 is disposed with the delivery port 21 being projected onto the plane in which the flow-control plate 40 is disposed. As illustrated in FIG. 3, in the flow-control plate 40, openings 41 are formed in the plane in which the flow-control plate 40 is disposed only in a range of the flow-control plate 40 of 27.5° or more and 332.5° or less in terms of a central angle with respect to a line (hereinafter, simply referred to as "reference line $L_0$") passing through the axis Cl of the outer tube 20 and the central position in the width direction of the delivery port 21.

In addition, it is preferable that a width W2, which is the width in a direction perpendicular to the axis direction D2 of the outer tube 20 (refer to FIG. 3), be 5 mm or more and 20 mm or less from the viewpoint of effectively realizing the effects of the disclosed embodiments. In addition, it is preferable that the width W2 be 15% or less of the outer diameter of the outer tube 20 from the viewpoint of effectively realizing the effects of the disclosed embodiments.

Figure 4:
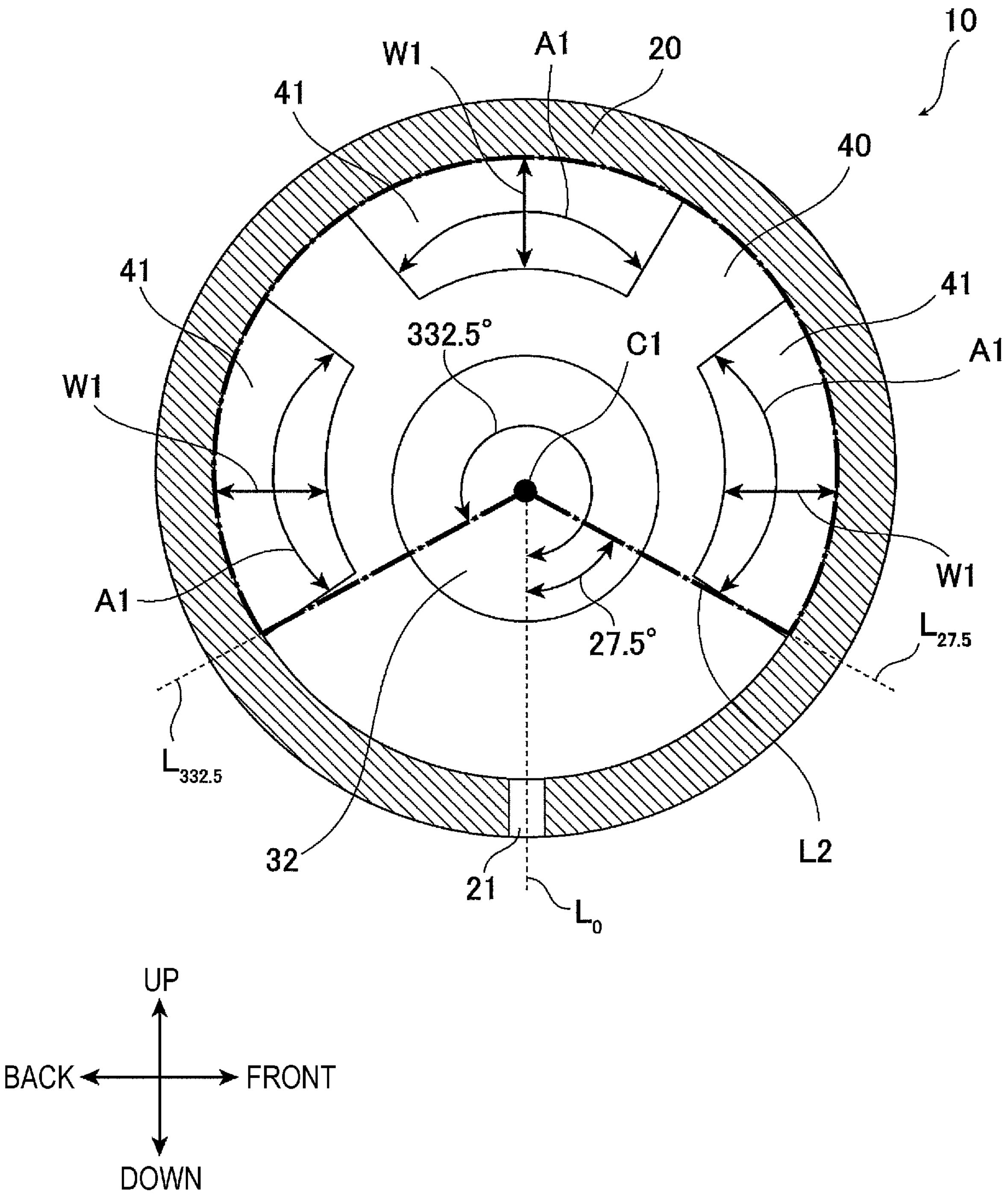
FIG. 4 is a sectional view illustrating a range of the flow-control plate of 27.5° or more and 332.5° or less in terms of a central angle with respect to the reference line.

Here, the range of the flow-control plate 40 of 27.5° or more and 332.5° or less in terms of the central angle with respect to the reference line $L_0$ is surrounded by the chain line L2 in FIG. 4.

In addition, in FIG. 3 and FIG. 4, a line $L_{27.5}$ indicating the position at an angle of 27.5° in terms of the central angle with respect to the reference line $L_0$ and a line $L_{332.5}$ indicating the position at an angle of 332.5° in terms of the central angle with respect to the reference line $L_0$ are represented by dotted lines.

Hereafter, the flow of the treatment gas in the slit nozzle 10, which is controlled by the flow-control plate 40, will be described.

Figure 10:
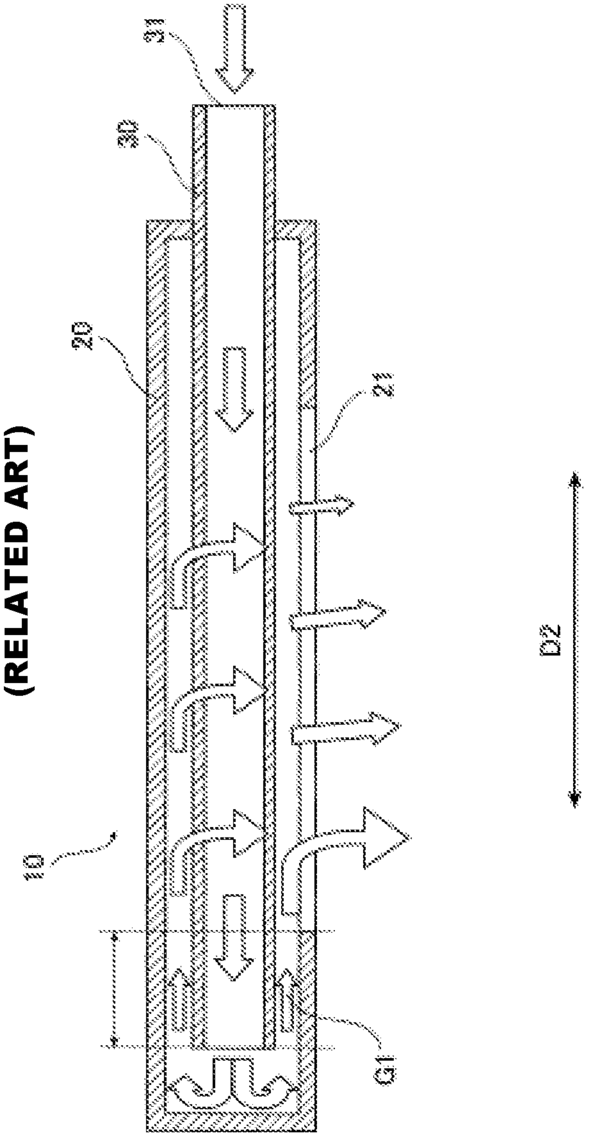
FIG. 10 (RELATED ART)
FIG. 10 is a sectional view illustrating a slit nozzle of the related art.
Figure 11:
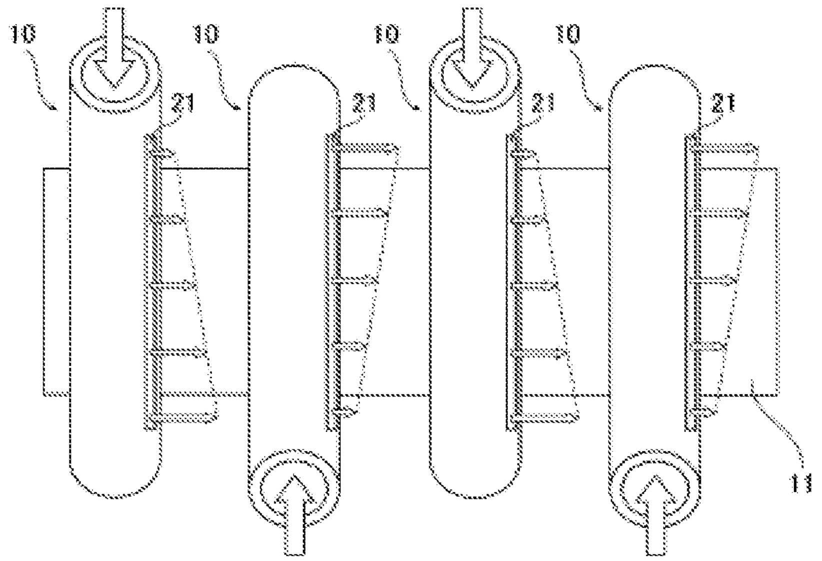
FIG. 11 (RELATED ART)
FIG. 11 is a schematic diagram according to the related art illustrating a case where adjacent slit nozzles are arranged so that their feeding ports for the treatment gas face opposite directions from each other.

As described above, the openings 41 are formed only in the range of the flow-control plate 40 of 27.5° or more and 332.5° or less in terms of the central angle with respect to the reference line $L_0$. That is, the range of 0° or more and less than 27.5° in terms of the central angle with respect to the reference line $L_0$ and the range of larger than 332.5° and less than 360° in terms of the central angle with respect to the reference line $L_0$ are completely closed by the flow-control plate 40. As a result, when the treatment gas which has been blown through the open end 32 of the inner tube 30 into the outer tube 20 is made to turn back inside the outer tube 20 and transported toward the delivery port 21, there is a decrease in the flow rate of the treatment gas, which is supposed to pass through the position at which the flow-control plate 40 is disposed, due to collision with the flow-control plate 40. Therefore, it is possible to decrease the flow rate of the treatment gas (indicated by the arrow G1 in FIG. 10) which is transported to the delivery port 21 for the treatment gas via the lower part of the inner tube 30 and which causes a variation in the amount of the blown treatment gas in the slit nozzle 10 according to the conventional art. As a result, it is considered to be possible to decrease a variation in the flow rate of the gas blown through the delivery port 21 depending on the position in the axis direction D2.

In addition, in the case of the example illustrated in FIG. 3, three openings 41 are formed in the flow-control plate 40. Here, the number of the openings 41 may be changed, and, for example, one, two, or four or more openings 41 may be formed.

It is preferable that the openings 41 be formed symmetrically with respect to the reference line $L_0$ in the plane in which the flow-control plate 40 is disposed. As a result, it is possible to decrease a variation in the flow rate of the blown gas depending on the position in the axis direction D2.

In addition, when the area fraction R of the openings 41 is defined by the equation below, it is preferable that the area fraction R be 55% or more and 75% or less from the viewpoint of achieving sufficient strength of the flow-control plate 40 while effectively realizing the effects of the disclosed embodiments.

area fraction R=area of openings/area of range of the flow-control plate 40 of 27.5° or more and 332.5° or less in terms of the central angle with respect to the reference line $L_0$ (the area of the region surrounded by the chain line L2 in FIG. 4)

Hereafter, the method for manufacturing the high-silicon steel strip (steel strip having a Si content of 4 mass % or more) according to the disclosed embodiments will be described. In the method for manufacturing the high-silicon steel strip according to the disclosed embodiments, a siliconizing treating method utilizing the slit nozzle 10 according to the disclosed embodiments is used.

Figure 5:
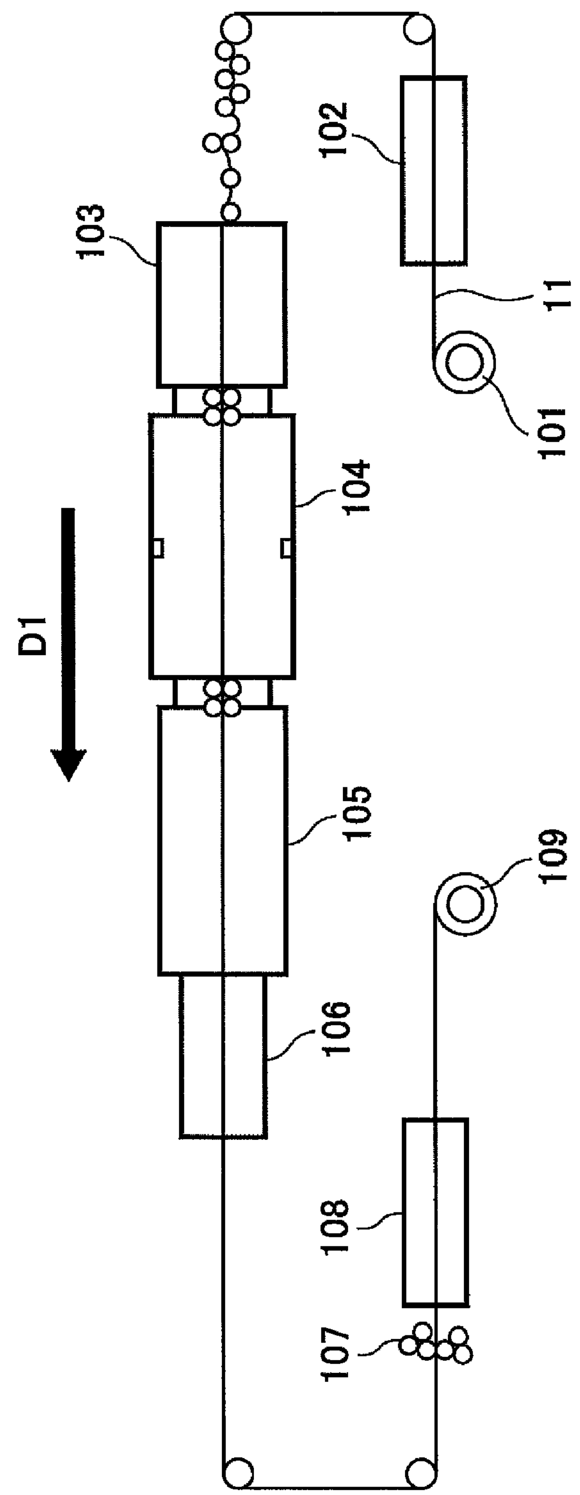
FIG. 5 is a schematic diagram illustrating an example of a continuous line for manufacturing a high-silicon steel strip.

FIG. 5 illustrates an example of a continuous line for manufacturing a high-silicon steel strip using a siliconizing treating method. In this manufacturing line, a steel strip 11 (for example, Si steel strip having a Si concentration of 3 mass %), which has been fed from a payoff reel 101, is transported through a cleaning apparatus 102, heated thereafter to a siliconizing temperature or to a temperature near the siliconizing temperature in a heating zone 103 in non-oxidizing atmosphere, and then transported into a siliconizing treating furnace 104.

In the siliconizing treating furnace 104, plural slit nozzles 10 according to the disclosed embodiments are arranged at intervals in the longitudinal direction of the furnace (threading direction D1). In the siliconizing treating furnace 104, a treatment gas containing a reactant gas, that is, silicon tetrachloride ($SiCl_4$), is blown through the slit nozzles 10 onto both surfaces of the steel strip 11. As a result of the blown $SiCl_4$ reacting with Fe contained in the steel strip 11, there is an increase in the amount of Si in the surface layer of the steel strip 11.

Subsequently, the steel strip 11 is transported into a diffusion soaking zone 105, and subjected to a diffusion heat treatment, in which Si is diffused in the thickness direction under a non-oxidizing atmosphere which does not contain $SiCl_4$. After having been cooled in a cooling zone 106, the steel strip 11 is coated with an insulating film by using an insulating film coater 107 and an oven 108 and then coiled to a tension reel 109 as a product steel strip (for example, high-silicon steel strip having a Si content of 6.5 mass %).

Figure 6:
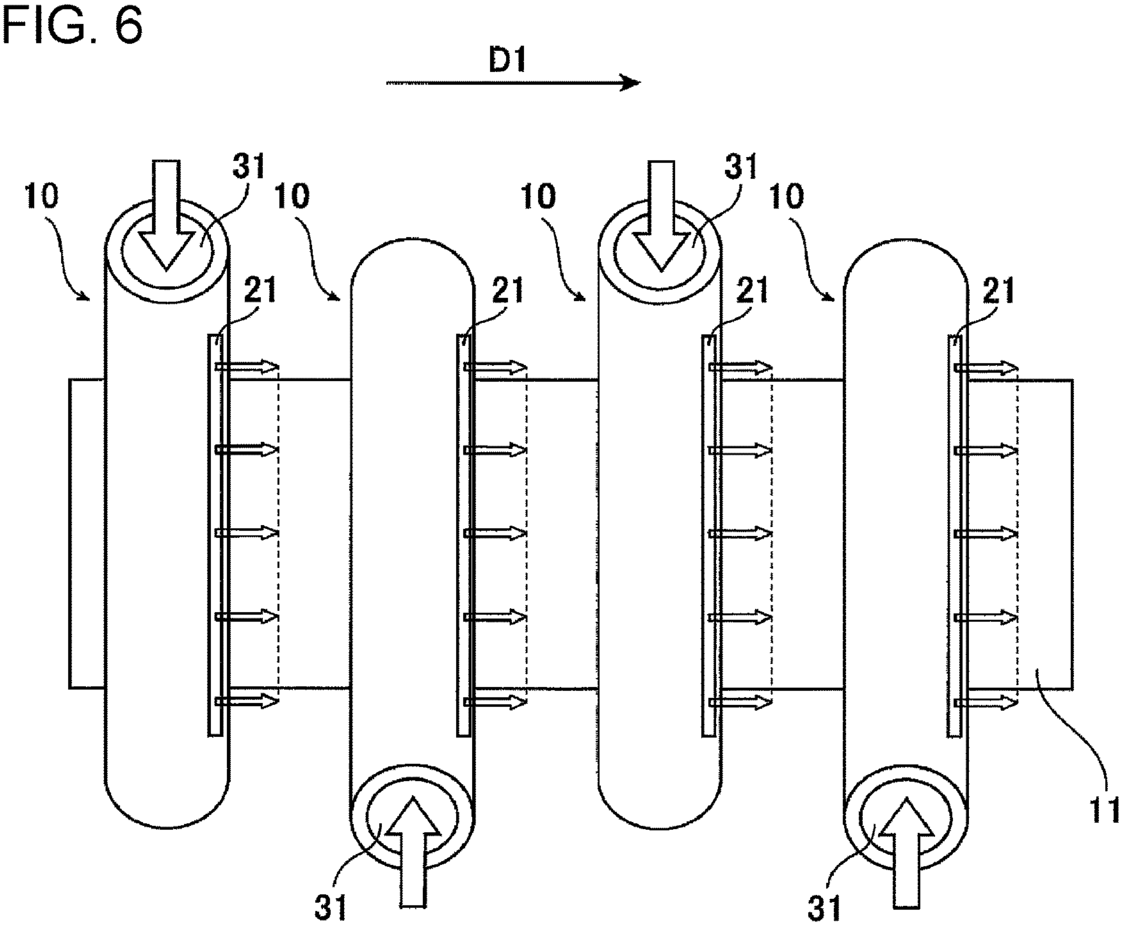
FIG. 6 is a schematic diagram illustrating a case where adjacent slit nozzles are arranged so that their feeding ports for the treatment gas face opposite directions from each other.

In addition, in the case of the method for manufacturing the high-silicon steel strip according to the disclosed embodiments, it is preferable that, in the siliconizing treating furnace 104, the plural slit nozzles 10 be arranged in the threading direction D1 of the steel strip 11 in the siliconizing treating furnace 104 such that slit nozzles 10 or groups of slit nozzles adjacent to each other in the threading direction D1 are arranged so that their feeding ports 31 for the treatment gas face opposite directions from each other (refer to FIG. 6). Here, the expression a "group of slit nozzles" denotes a group including two or more slit nozzles 10. Here, although FIG. 6 illustrates only one surface side of the steel strip 11, the slit nozzles 10 are similarly arranged on the other surface side.

The method for manufacturing a high-silicon steel strip has a process of feeding a treatment gas containing silicon tetrachloride ($SiCl_4$) through the feeding ports 31 for the treatment gas into the slit nozzles 10 arranged as described above and blowing the treatment gas through the delivery ports 21 of the slit nozzles 10 onto the transported steel strip 11.

Here, in the case of the slit nozzles 10 according to the disclosed embodiments, since a variation in the flow rate of the treatment gas blown through the delivery ports 21 depending on the position in the axis direction D2 is small, the slit nozzles 10 may be arranged so that the feeding ports 31 for the treatment gas face the same direction. However, when the slit nozzles 10 are arranged so that the feeding ports 31 face opposite directions from each other as described above, it is possible to further decrease a variation in the flow rate of the blown gas depending on the position in the axis direction D2 (a direction perpendicular to the threading direction D1) as the total effect of the plural slit nozzles 10 arranged in the siliconizing treating furnace. Therefore, by using the siliconizing treating method, it is possible to stably manufacture a high-silicon steel strip having a small variation in the Si concentration depending on the position in the width direction of the steel strip.

It will be appreciated that the above-disclosed features and functions, or alternatives thereof, may be desirably combined into different systems or methods. Also, various alternatives, modifications, variations or improvements may be subsequently made by those skilled in the art, and are also intended to be encompassed by the disclosed embodiments. As such, various changes may be made without departing from the spirit and scope of this disclosure.

EXAMPLES

Although the disclosed embodiments will be specifically described in accordance with examples hereafter, the disclosed embodiments are not intended to be limited to the examples.

Example 1: Evaluating the Positions of Openings in a Flow-Control Plate

<Manufacturing Slit Nozzle 1>

An outer tube (having an inner diameter of 120 mm, an outer diameter of 140 mm, and a delivery port for a treatment gas having a size of 70 cm (in the axis direction)× 10 mm (in a direction perpendicular to the axis direction)), an inner tube (having an inner diameter of 60 mm and an outer diameter of 70 mm), and a flow-control plate 1 as described below were prepared. Subsequently, the inner tube is arranged inside the outer tube so that the outer tube and the inner tube had an identical axis, the flow-control plate 1 is disposed at the open end of the inner tube, and a slit nozzle 1 as illustrated in FIG. 2 was thus manufactured. Here, the distance between the closed end of the outer tube and the open end of the inner tube was set to be 25 mm.

Three openings as described below were formed in the flow-control plate 1. In addition, all the three openings had an identical size. Each of the three openings in the flow-control plate 1 had a width W1 of 10 mm and a central angle A1 of 50° (refer to FIG. 4). In addition, the openings were located respectively in the ranges of 35° or more and 85° or less, 155° or more and 205° or less, and 275° or more and 325° or less in terms of the central angle with respect to the reference line $L_0$ in the plane in which the flow-control plate is disposed.

<Manufacturing Slit Nozzles 2 Through 6>

Flow-control plates 2 through 6, whose openings had the central angles with respect to the reference line $L_0$ which were different from those of the flow-control plate 1 and which are given in Table 1, were manufactured. In addition, slit nozzles 2 through 6 were manufactured by using the same manufacturing method as that for the slit nozzle 1, except that the flow-control plates 2 through 6 were used instead of the flow-control plate 1.

Here, the width W1 and the central angle A1 of the openings of the flow-control plates 2 through 6 were the same as those of the flow-control plate 1. Therefore, the flow-control plates 1 through 6 were different from each other only in terms of the positions of the openings and had the same total area of the three openings.

TABLE 1

| Flow-control Plate No. | Opening Width W1 (mm) | Opening Angle A1 (°) | Central Angle with Respect to Reference Line $L_0$ | Note |
|---|---|---|---|---|
| 1 | 10 | 50 | 35° or more and 85° or less<br>155° or more and 205° or less<br>275° or more and 325° or less | Example |
| 2 | 10 | 50 | 30° or more and 80° or less<br>155° or more and 205° or less<br>280° or more and 330° or less | Example |
| 3 | 10 | 50 | 27.5° or more and 77.5° or less<br>155° or more and 205° or less<br>282.5° or more and 332.5° or less | Example |
| 4 | 10 | 50 | 25° or more and 75° or less<br>155° or more and 205° or less<br>285° or more and 335° or less | Comparative Example |
| 5 | 10 | 50 | 15° or more and 65° or less<br>155° or more and 205° or less<br>295° or more and 345° or less | Comparative Example |
| 6 | 10 | 50 | 7.5° or more and 57.5° or less<br>155° or more and 205° or less<br>302.5° or more and 352.5° or less | Comparative Example |

In addition, when an area fraction R is defined by the equation below, each of the area fractions R of the flow-control plates 1 through 3, which are the examples of the disclosed embodiments, was 62.3%.

area fraction R=area of openings/area of range of the flow-control plate of 27.5° or more and 332.5° or less in terms of the central angle with respect to the reference line $L_0$ (the area of the region surrounded by the chain line L2 in FIG. 4)

<Determining and Evaluating the Flow Rate of a Blown Treatment Gas>

While a treatment gas was fed into the slit nozzles 1 through 6 through their feeding ports at a flow rate of 2.3 m/sec, the flow rate of a treatment gas blown from their delivery ports for the treatment gas was determined. When the flow rate of the treatment gas was determined, nitrogen was used as the treatment gas.

Figure 7:
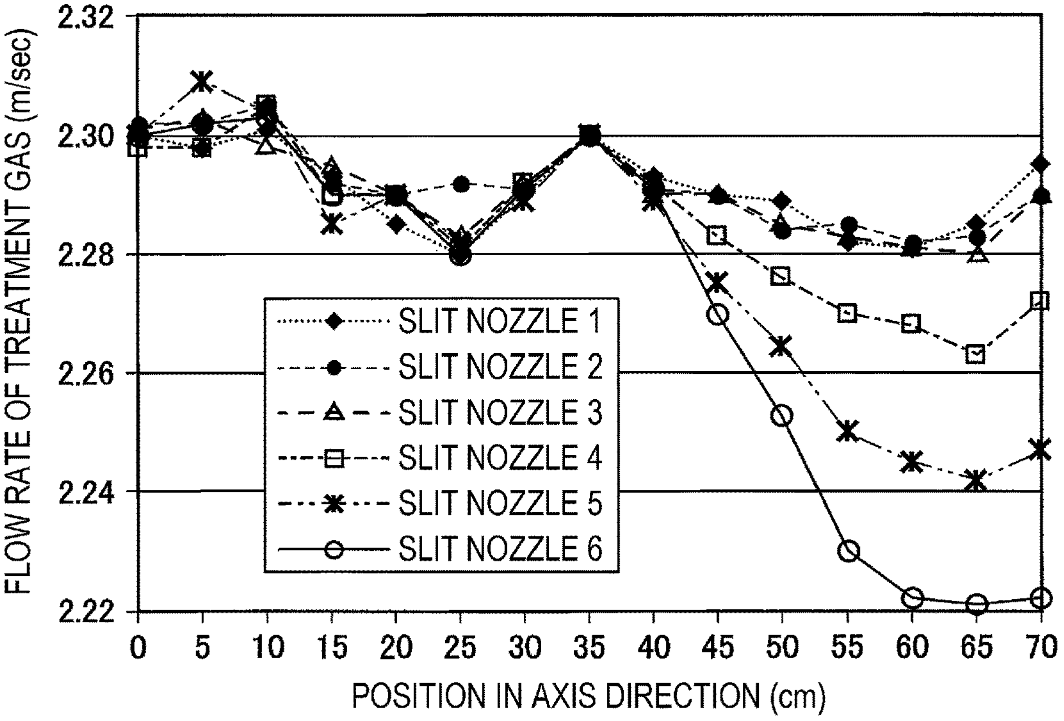
FIG. 7 is a graph illustrating the evaluation results of Example 1.

FIG. 7 is a graph illustrating the evaluation results, that is, the relationship between the position in the axis direction (cm) and the flow rate of the treatment gas (m/sec). Here, regarding the position in the axis direction (cm) measured along the horizontal axis, the point of 0 cm corresponds to the end of the delivery port on the side of the feeding port for the treatment gas. In addition, the point of 70 cm corresponds to the end of the delivery port on the side of the open end of the inner tube.

From the results illustrated in the graph in FIG. 7, it was clarified that, in the slit nozzles 1 through 3 where the openings are formed only in the range of the flow-control plate 40 of 27.5° or more and 332.5° or less in terms of the central angle with respect to the reference line $L_0$, it was possible to maintain the flow rate of the treatment gas within a range of 2.28 m/sec to 2.32 m/sec in the range of 0 cm to 70 cm in terms of the position in the axis direction. Therefore, it was clarified that, in the slit nozzles 1 through 3, it is possible to decrease a variation in the flow rate of the gas blown through the delivery port depending on the position in the axis direction D2.

Example 2: Evaluating the Flow Rate of the Treatment Gas when Slit Nozzles are Arranged so that Feeding Ports Face Opposite Directions from Each Other Two of slit nozzles 3 (example of the disclosed embodiments) used in Example 1 were arranged for a steel strip so that their feeding ports for the treatment gas face different (opposite) directions from each other. Here, two of the slit nozzles 1 were arranged so that positions of their delivery ports (slits) are the same in the threading direction of the steel strip.

In addition, while the treatment gas was fed through the feeding port for the treatment gas into one of the two arranged slit nozzles at a flow rate of 1.5 m/sec and into the other at a flow rate of 3.0 m/sec, the flow rate of a treatment gas blown from each of the delivery ports for the treatment gas was determined. When the flow rate of the treatment gas was determined, nitrogen was used as the treatment gas. In addition, the flow rate of each of the two slit nozzles was determined at the positions in the axis direction, and the sum of the flow rates at the same position of the two slit nozzles was defined as the flow rate of the treatment gas at the same position in the axis direction.

In addition, as a comparative example (conventional example), two of slit nozzles 7, which had no flow-control plate, were prepared. Such two slit nozzles 1 were arranged so that positions of the delivery ports (slits) are the same in the threading direction of the steel strip in the same way as in the case of slit nozzles 3 (example of the disclosed embodiments), except that slit nozzles 7 were used instead of slit nozzles 3. The treatment gas was fed into the slit nozzles 7 in the same way as in the case of the example of the disclosed embodiments, and the flow rate of the treatment gas blown through the delivery ports for the treatment gas was determined in the same way as in the case of the example of the disclosed embodiments.

Figure 8:
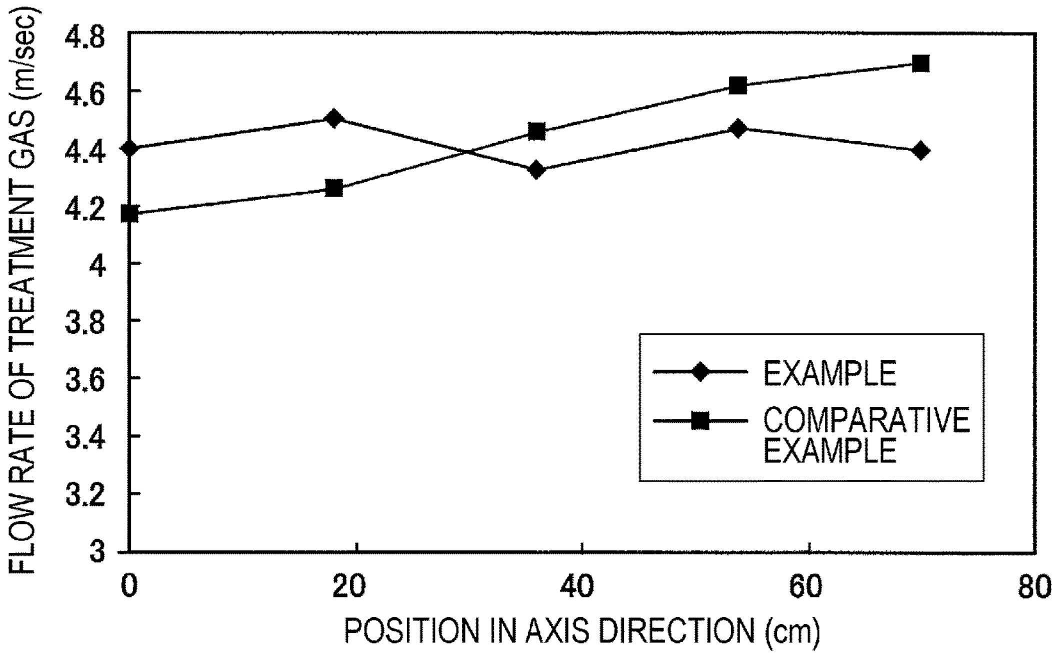
FIG. 8 is a graph illustrating the evaluation results of Example 2.

FIG. 8 is a graph illustrating the determination results of the flow rate of the treatment gas when the slit nozzles 3, that is, the example of the disclosed embodiments, and the slit nozzle 7, that is the comparative example, were used. FIG. 8 is a graph illustrating the relationship between the position in the axis direction and the flow rate of the treatment gas.

Here, regarding the position in the axis direction (cm) measured along the horizontal axis in FIG. 8, the point of 0 cm corresponds to the end of the delivery port on the side of the feeding port for the treatment gas of the slit nozzle into which the treatment gas was fed at a flow rate of 1.5 m/sec. In addition, the point of 70 cm corresponds to the end of the delivery port on the side of the open end of the inner tube of the relevant slit nozzle.

As illustrated in FIG. 8, in the case where the slit nozzle of the comparative example was used, a variation (maximum value−minimum value) in the flow rate of the treatment gas depending on the position in the axis direction was 0.42 m/sec. In contrast, in the case where the slit nozzle of the example of the disclosed embodiments was used, it was possible to decrease a variation (maximum value−minimum value) in the flow rate of the treatment gas depending on the position in the axis direction to 0.17 m/sec.

Example 3: Evaluating the Manufacturing of a High-Silicon Steel Strip

After a silicon steel strip (having a thickness of 100 μm, a width of 600 mm, a Si concentration of 3.4 mass %, and Young's modulus of 210 GPa (room temperature) had been prepared, a high-silicon steel strip having a silicon content of 6.5 mass % was manufactured by using the continuous manufacturing line illustrated in FIG. 5.

In the manufacturing of the high-silicon steel strip of the example of the disclosed embodiments, two of slit nozzles 3 (example of the disclosed embodiments) in Example 1 were arranged for the steel strip on each of the front-surface side and back-surface side of the steel strip such that the slit nozzles adjacent to each other were arranged so that their feeding ports for a treatment gas faced in different (opposite) directions from each other in the siliconizing treating furnace of the continuous manufacturing line in FIG. 5. In addition, as in the case of Example 2, the treatment gas (treatment gas containing silicon tetrachloride) was fed through the feeding port for the treatment gas into one of the two slit nozzles adjacent to each other in the threading direction at a flow rate of 1.5 m/sec and into the other at a flow rate of 3.0 m/sec.

In addition, the high-silicon steel strip of the comparative example was manufactured in the same way as in the case of the example of the disclosed embodiments, except that the slit nozzles 7 were used instead of the slit nozzles 3.

Figure 9:
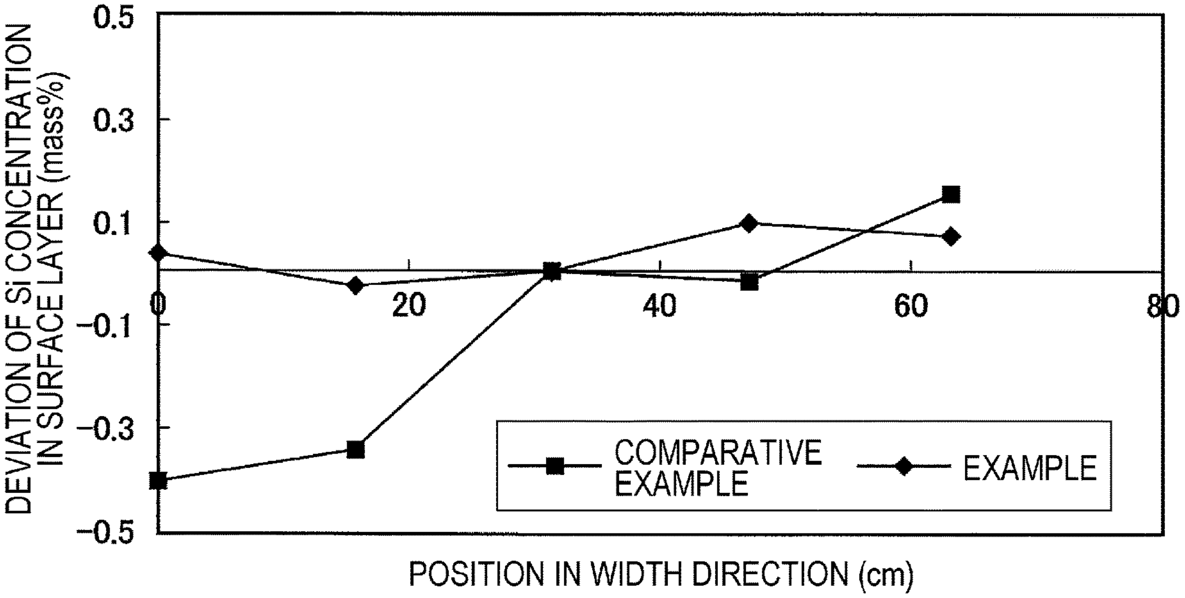
FIG. 9 is a graph illustrating the evaluation results of Example 3.

FIG. 9 illustrates the determination results of the deviation of the Si concentration (mass %) in the surface layer of the manufactured high-silicon steel strip depending on the position in the width direction. Here, the deviation of the Si concentration (mass %) in the surface layer was defined as the difference from the Si concentration at a reference position, where the central position in the width direction was defined as the reference position (having a deviation of 0 mass %). The Si concentration in the surface layer was determined by performing X-ray fluorescence spectrometry.

From the results illustrated in FIG. 9, it was clarified that, in the case where the slit nozzles of the comparative example were used, the deviation (maximum value–minimum value) of the Si concentration (mass %) in the surface layer was 0.55 mass %. In contrast, in the case where the slit nozzles of the example of the disclosed embodiments were used, it was possible to decrease the deviation (maximum value–minimum value) of the Si concentration (mass %) in the surface layer to 0.10 mass %.

From the results of the examples described above, it was clarified that, according to the disclosed embodiments, it is possible to provide a slit nozzle having a double-tube structure with which it is possible to decrease a variation in the flow rate of a blown gas depending on the position in the axis direction. In addition, it was clarified that, by using the slit nozzle according to the disclosed embodiments, it is possible to stably manufacture a high-silicon steel strip having a small variation in the Si concentration depending on the position in the width direction.

The invention claimed is:

1. A slit nozzle having a double-tube structure, the slit nozzle comprising:

an outer tube having a delivery port for a treatment gas in an axial direction and a closed end;

an inner tube having a feeding port for the treatment gas on one end and an open end that is another end inside the closed end of the outer tube, the treatment gas configured to be fed through the feeding port and blown through the delivery port; and a flow-control plate disposed between the open end of the inner tube and an end of the delivery port, the flow-control plate closing a gap between the inner tube and the outer tube, wherein an opening is formed in a plane in which the flow-control plate is disposed only in a range of the flow-control plate of 27.5° or more and 332.5° or less in terms of a central angle with respect to a reference line passing through an axis of the outer tube and a central position in a width direction of the delivery port, wherein an area fraction, which is an area of the opening divided by an area of the range of the flow-control plate of 27.5° or more and 332.5° or less in terms of the central angle with respect to the reference line, is 55% or more and 75% or less, and wherein a width of the delivery port, in a direction perpendicular to the axis of the outer tube, is 5 mm or more and 20 mm or less and is 15% or less of an outer diameter of the outer tube.

2. The slit nozzle according to claim 1, wherein the flow-control plate is disposed at the open end of the inner tube.

3. The slit nozzle according to claim 2, wherein the opening is formed symmetrically with respect to the reference line in the plane in which the flow-control plate is disposed.

4. A method for manufacturing a high-silicon steel strip including a siliconizing treating method using a plurality of slit nozzles according to claim 3, the method comprising:

arranging the slit nozzles in a threading direction of a steel strip in a siliconizing treating furnace such that adjacent slit nozzles or adjacent groups of slit nozzles adjacent to each other in the threading direction are arranged so that feeding ports for the treatment gas of the slit nozzles face opposite directions from each other; and feeding the treatment gas through the feeding ports for the treatment gas into the slit nozzles and blowing the treatment gas through the delivery ports for the treatment gas of the slit nozzles onto the steel strip during transport, wherein the treatment gas contains silicon tetrachloride.

5. A method for manufacturing a high-silicon steel strip including a siliconizing treating method using a plurality of slit nozzles according to claim 2, the method comprising:

arranging the slit nozzles in a threading direction of a steel strip in a siliconizing treating furnace such that adjacent slit nozzles or adjacent groups of slit nozzles adjacent to each other in the threading direction are arranged so that feeding ports for the treatment gas of the slit nozzles face opposite directions from each other; and feeding the treatment gas through the feeding ports for the treatment gas into the slit nozzles and blowing the treatment gas through the delivery ports for the treatment gas of the slit nozzles onto the steel strip during transport, wherein the treatment gas contains silicon tetrachloride.

6. The slit nozzle according to claim 1, wherein the opening is formed symmetrically with respect to the reference line in the plane in which the flow-control plate is disposed.

7. A method for manufacturing a high-silicon steel strip including a siliconizing treating method using a plurality of slit nozzles according to claim 6, the method comprising:

arranging the slit nozzles in a threading direction of a steel strip in a siliconizing treating furnace such that adjacent slit nozzles or adjacent groups of slit nozzles adjacent to each other in the threading direction are arranged so that feeding ports for the treatment gas of the slit nozzles face opposite directions from each other; and feeding the treatment gas through the feeding ports for the treatment gas into the slit nozzles and blowing the treatment gas through the delivery ports for the treatment gas of the slit nozzles onto the steel strip during transport, wherein the treatment gas contains silicon tetrachloride.

8. A method for manufacturing a high-silicon steel strip including a siliconizing treating method using a plurality of slit nozzles according to claim 1, the method comprising:

arranging the slit nozzles in a threading direction of a steel strip in a siliconizing treating furnace such that adjacent slit nozzles or adjacent groups of slit nozzles adjacent to each other in the threading direction are arranged so that feeding ports for the treatment gas of the slit nozzles face opposite directions from each other; and feeding the treatment gas through the feeding ports for the treatment gas into the slit nozzles and blowing the treatment gas through the delivery ports for the treatment gas of the slit nozzles onto the steel strip during transport, wherein the treatment gas contains silicon tetrachloride.

* * * * *